United States Patent [19]

Sebek

[11] 3,964,312

[45] June 22, 1976

[54] MAGNETICALLY ACTUATED FLUID-LEVEL INDICATOR

[75] Inventor: Rolf Sebek, Oberkinzig, Germany

[73] Assignee: Phoenix Armaturen Werke Bregel GmbH, Frankfurt am Main, Germany

[22] Filed: Apr. 4, 1975

[21] Appl. No.: 565,124

[30] Foreign Application Priority Data

Apr. 8, 1974 Germany.................... 7412308[U]

[52] U.S. Cl.............................. 73/314; 73/307; 73/319; 73/DIG. 5
[51] Int. Cl.².................................. G01F 23/12
[58] Field of Search............. 73/290 R, DIG. 5, 307, 73/313, 319, 305, 314; 116/114 K

[56] References Cited
UNITED STATES PATENTS

| | | | |
|---|---|---|---|
| 1,040,127 | 10/1912 | Bonesteel | 73/319 |
| 2,920,484 | 1/1960 | Reichert | 73/319 |
| 3,420,103 | 1/1969 | Peschek | 73/319 |

*Primary Examiner*—Richard C. Queisser
*Assistant Examiner*—Frederick Shoon
*Attorney, Agent, or Firm*—Bacon & Thomas

[57] ABSTRACT

Disclosed is a magnetically actuated fluid-level indicator for indicating the level of a fluid contained in a vessel having a gauge tube attached thereto and having a magnet-containing float floating in the gauge tube, the indicator comprising a plurality of interlocking elements united with one another, wherein each element comprises a support body and a magnetically actuated indicator means supported thereon.

16 Claims, 5 Drawing Figures

FIG.1
FIG.2a
FIG.2b
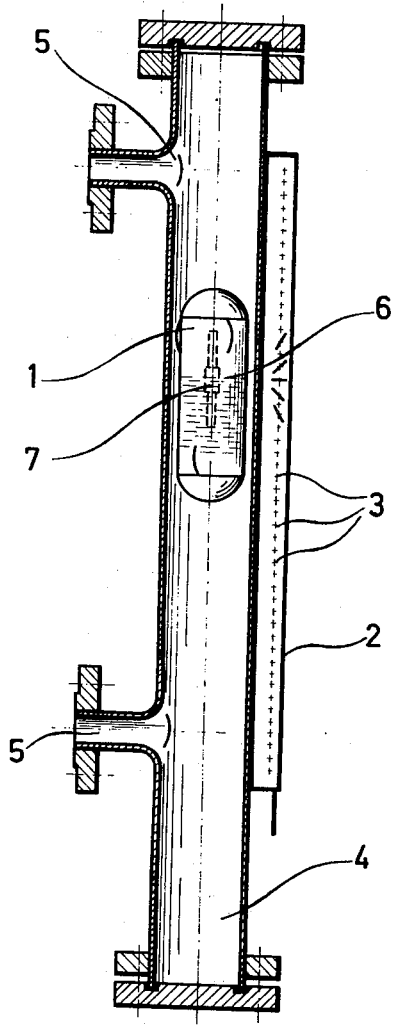
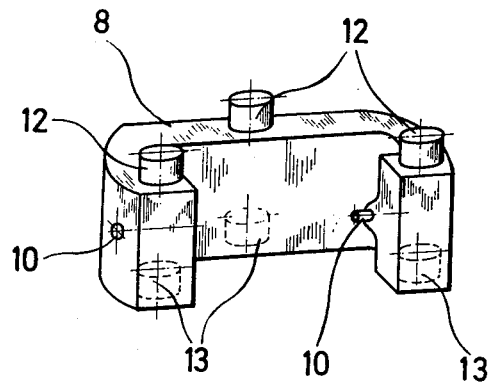
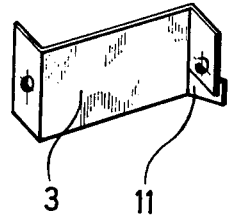

MAGNETICALLY ACTUATED FLUID-LEVEL INDICATOR

BACKGROUND OF THE INVENTION

The present invention relates to fluid-level indicating devices, and more especially to a magnetically actuated fluid level indicator having a gauge tube operatively connected to the vessel containing a fluid, in which gauge tube is contained a freely floating magnet which moves up and down in proportion to the fluid level, and having an indicating mechanism arranged on the gauge tube. The indicating mechanism comprises a plurality of indicating platelets which are mounted in such a manner that they can rotate nearly 180° in response to the effect of the magnet.

A fluid-level indicator of this general type is disclosed in German Patent No. 1,301,149. This type of fluid-level indicator is employed in those situations wherein the gauge tube for one reason or another cannot be manufactured of a transparent material, e.g., because of the pressure requirements placed thereon.

This known construction of fluid-level indicator results in the disadvantage that the indicating mechanism must be mounted by hand, which can require expenditure of considerable time and effort. A further disadvantage results from the fact that the known indicating mechanism must be produced in a particular, fixed length, which is sufficient in every case to accommodate the maximum variation in fluid level in the vessel with which the device is to be fitted. Consequently, in order to satisfy the various use requirements arising from situation to situation, there must either be provided a large number of indicating mechanisms of various lengths or a single stock mechanism of an unnecessarily long dimension, the latter requiring placement on the market at an unnecessarily high cost.

A further disadvantage of the prior art indicating mechanism is that it is not sufficiently protected against the highly corrosive surroundings which in many instances exist in connection with such fluid storage vessels.

SUMMARY OF THE INVENTION

It is therefore an object of the present invention to provide an improved fluid-level indicator.

A further object of the present invention resides in the provision of a fluid-level indicator which avoids the disadvantages of prior art indicator devices discussed above.

It is also an object of the present invention to provide an improved fluid-level indicator which readily permits of automated fabrication.

Still another object of the present invention resides in the provision of an improved fluid-level indicator which permits of ready adaptation to every possible use requirement.

It is a still further object of the present invention to provide an improved fluid-level indicator which is reliably protected from corrosion.

In accomplishing the foregoing objects, there has been provided in accordance with the present invention a magnetically actuated fluid-level indicator for indicating the level of a fluid contained in a vessel having a gauge tube attached thereto and having a magnet-containing float freely floating in the gauge tube by attaching the indicator to the gauge tube, the indicator comprising a plurality of interlocking elements united in a row, each element comprising a support body and a magnetically actuated indicator means supported thereon. The magnetically actuated indicator means preferably comprise a rotatably mounted platelet of magnetically attractable material. In a preferred embodiment, the support bodies are each of substantially U-shaped configuration and the platelets are supported between the legs of the U; the interlocking elements are provided on one end with coupling projections and on the opposite end with recesses for receiving the coupling projections from the next adjacent element; each platelet comprises a generally Z-shaped cross-section wherein mounting means are provided on each leg of the Z; and the entire indicator is surrounded by a sealed, transparent casing.

In another aspect of the present invention, there is provided a magnetically actuated fluid-level indicator assembly including a gauge tube attached in operative communication with a vessel containing a fluid, a magnet-containing float freely floating in the fluid contained in the gauge tube and a magnetically actuatable indicator contiguous to the gauge tube, the improvement comprising the magnetically actuatable indicator including a plurality of interlocking elements united in a row, with each element comprising a support body and a magnetically actuated indicating means supported thereon.

Further objects, features and advantages of the present invention will become apparent from the following detailed description of preferred embodiments, when considered together with the attached figures of drawings.

BRIEF DESCRIPTION OF THE DRAWINGS

In the drawings:

FIG. 1 is a vertical sectional view of a liquid-level indicating assembly in accordance with the present invention;

FIG. 2a is a perspective view of the support portion of a single building-block element utilized to construct the liquid level indicator of the invention;

FIG. 2b is a perspective view of a magnetically attractable indicating platelet of the invention;

DETAILED DESCRIPTION OF PREFERRED EMBODIMENTS

Figure 3:
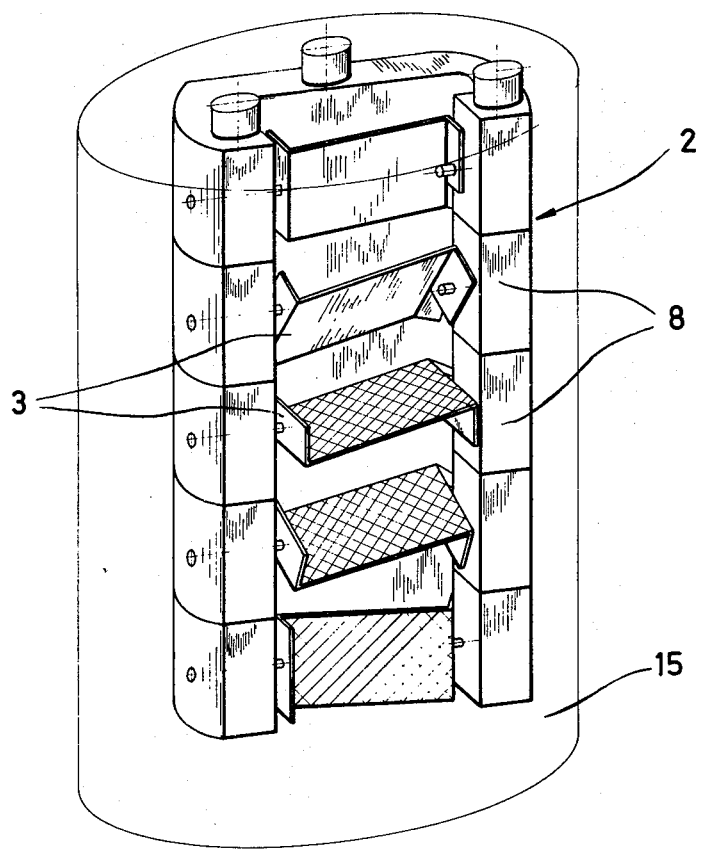
FIG. 3 is a perspective view illustrating the detailed construction of an indicator according to the invention.
Figure 4:
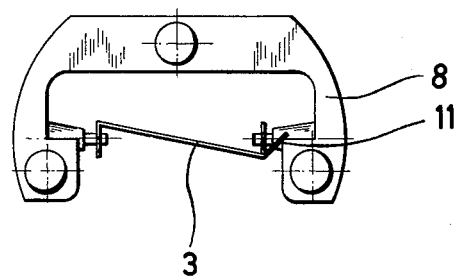
FIG. 4 is a top plan view of a building-block element of the invention.

The present invention provides an improvement over the fluid-level indicators of the type generally described in the introduction of the present application by providing that the indicating device is comprised of a plurality of interlocking indicator elements, each of which is made up of a supporting body having an indicating means mounted therein, preferably an indicating platelet.

In this manner, the result is accomplished that the individual indicator element can be easily manufactured by mass production techniques and that the indicator device which is produced by interlocking a plurality of such elements in a building-block manner can be readily obtained in exactly the required length which corresponds to the differential in fluid level expected during operation of the fluid-containing vessel or which exceeds this length by a small amount.

It is advantageous if the indicator elements exhibit an approximately U-shaped cross-section and if the preferred indicator platelet in each is mounted between the legs of the U. Furthermore, it is advantageous that each indicator element comprise on one of its coupling surfaces one or more coupling projections, and that it comprise on its opposing coupling surface respective coupling recesses for receiving the coupling projections of the next adjacent indicator element. In this manner, the individual indicator elements can easily be exactly aligned and joined to one another in a stable fashion.

It is a particularly advantageous embodiment of the present invention to design the couplin projections in the form of round lugs or pins, and correspondingly to provide the coupling recesses in the form of either round apertures or slot-like cavities. If these lugs and recesses interengage tightly with one another, the cohesion of the individual elements of the indicating device is assured, which contributes considerably to facilitating the handling of the device during mounting.

The indicator platelets are advantageously formed into a general Z-shape, and the mounting thereof is provided on both legs of the Z. The oblique portion of the Z-form serves as the indicating portion, having been provided with different colors on the front and back sides thereof. In connection herewith, it is especially advantageous if the lugs serving to mount the rotatable platelets are formed on the individual indicator elements, i.e., integrally formed thereon during manufacture, whereas the mounting apertures for receiving these lugs are provided in the platelets.

In order to limit the rotation of the platelets, it is advantageous if these are bent on one of their sides across only a part of its width in order to form one leg of the Z, so that the web or flange remaining unbent or only partially bent serves as a stop to limit rotation.

In order to assure protection against corrosion, it is advantageous if the indicator device is placed in a tightly sealed inspection tube, whereby the possibility presents itself to fasten the inspection tube onto the gauge tube associated with the vessel.

With reference now to the drawings, in FIG. 1 there is identified with reference numeral 4 the gauge tube which is in operative communication by means of connecting sections 5 with the fluid-containing vessel in which the fluid level is to be observed. The fluid-containing vessel itself is not illustrated. The fluid level 6 in the gauge tube 4 follows the fluid level in the vessel.

In the gauge tube 4 there is placed a float 1 which moves up and down in accordance with the fluid level. A magnet 7 is fastened inside the float in such a manner that it always lies at the same height as the fluid level. In this regard, the specific gravity of the fluid contained in the vessel is to be taken into consideration.

On the front side of the gauge tube 4 there is fastened in a suitable manner the indicator device 2 which consists of a plurality of rotatable indicator platelets 3 made of a magnetically activatable material. The indicator platelets 3 change their position of rotation as a result of the effect of the magnetic field as the magnet 7 passes by the respective platelets.

From FIG. 1 it may be observed that the indicator platelets which lie at approximately the same height as the magnet occupy a partially-rotated position, whereas the indicator platelets located above and below are oriented approximately vertically and form an essentially closed indicator face. The platelets lying above the magnet therefore turn the one surface to the observer whereas the platelets located below the magnet have the opposite surface exposed to the viewer. Since the front and back surfaces of the platelets are provided with different colors, the fluid level becomes strikingly clear.

It is to be understood that instead of the indicator platelets and/or in addition thereto, there may also be arranged at different levels electrical contact devices which are activated as the magnet passes by.

In FIG. 3 there is shown how the indicator device 2 is constituted from a plurality of indicator elements 8 corresponding to the number of indicator platelets. Each of the indicator elements represents a bracket or yolk having an approximately U-shaped cross-section. As may be seen from FIG. 2a, each indicator element 8 comprises on its one endplane serving for engagement of additional similar elements coupling projections 12 and on the opposite end-plane corresponding coupling recesses 13, which are illustrated in the embodiment shown as having a circular cross-section in the form of pins or lugs with corresponding round apertures.

As a result of the structure described, the indicator device can easily be constructed from the individual elements 8 to any desired length.

Each indicator platelet 3 is bent or formed into a generally Z-shaped form, and the mounting thereof is provided on the two legs of the Z which are parallel to one another by means of pins 10, with the oblique portion lying between the legs of the Z representing the indicating surface which is provided on each side with a different color.

An especially simple and cost-favorable embodiment of the invention is achieved when the mounting pins are formed integrally together with the element 8, so that the indicator platelets need only contain round apertures in each of the two legs for receiving these mounting pins.

In order to limit the rotation of the indicator platelets 3 to approximately 180°, one of the legs of the platelet is not bent across its entire width fully out of the plane of the sheet material into the Z configuration, but instead a small web or flange is left oriented essentially in the same plane as the indicating surfaces. This web serves as a stop 11 and cooperates with a respective surface of the element 8.

It is furthermore a particularly essential feature, and one of independent importance, that the entire indicator device 2 is placed in an inspection tube 15 (FIG. 3) which is transparent on at least its front side. This inspection tube is sealed at its top and bottom, so that the indicating device is hermetically sealed and is housed safe from all attacks of corrosion. The inspection tube 15 itself is fastened to the gauge tube 4 in a suitable fashion. Rigid seating of the indicating device 2 in the inspection tube 15 is assured by a suitable rigid bond, for example, by cementing, heat bonding, or the like.

While the foregoing invention has been described with reference to certain specific embodiments thereof, it is to be understood that the scope of property rights pertaining to this invention is to be determined solely with reference to the claims appended hereto.

What is claimed is:

1. An element adapted for mass production and being suitable for construction of a variable length magnetically actuated fluid-level indicator for indicating the level of a fluid contained in a vessel having a gauge tube attached thereto and having a magnet-containing float freely floating in the gauge tube, the indicator length being readily adaptable to correspond to the maximum expected variation of fluid level in said vessel, said element being adapted for interlocking with similar elements and comprising:
  a. a support body having a substantially U-shaped cross section and comprising a first and a second coupling surface;
  b. the first of said coupling surfaces including an attaching means;
  c. the second of said coupling surfaces including a receiving means for receiving attaching means of a first coupling surface of a second similar element; and
  d. an indicating means comprising a magnetically actuatable platelet rotatably supported by said support body.

2. A variable length, magnetically actuated fluid-level indicator comprising a plurality of sections, each section comprising an element as defined by claim 1.

3. In a magnetically actuated fluid-level indicator assembly including a gauge tube attached in operative communication with a vessel containing a fluid, the level of which is to be indicated, a magnet-containing float freely floating in the fluid contained in the gauge tube and a magnetically actuatable indicator contiguous to the gauge tube, the improvement which comprises said magnetically actuatable indicator being the indicator defined by claim 2.

4. The fluid level indicator assembly as defined by claim 3, further comprising a sealed transparent casing surrounding said indicator and being attached to the gauge tube.

5. The element as defined by claim 1, wherein the front and back side of each of said platelets are colored differently from one another.

6. An element as recited in claim 1, suitable for mass production, wherein
  a. said support body further comprises integrally formed mounting pins for supporting said indicating means; and
  b. said indicating means having mounting means for receiving said mounting pins,
  whereby formation of the elements is simplified, eliminating a requirement for hand-mounting of said mounting pins.

7. An element as recited in claim 6 wherein said indicating means has a Z-shaped vertical cross section, and said mounting means are positioned on legs of said Z-shape such that the center of gravity of said indicating means lies on an axis of rotation of said indicating means, thereby providing for a free rotation about said axis.

8. The element as defined by claim 6, wherein said first coupling surface comprises at least one coupling projection and said second surface comprises at least one recess for receiving the coupling projection from the next adjacent element.

9. The element as defined by claim 8, wherein said coupling projection comprises a round lug.

10. The element as defined by claim 9, wherein said recess comprises a round cross-section.

11. The element as defined by claim 9, wherein said recess comprises a slot-like cross-section.

12. The element as defined by claim 6, wherein each of said indicator platelets comprises on one side a stop for cooperating with one of said mounting pins to limit rotation of said platelet.

13. The element as defined by claim 12, wherein said stop comprises a portion of one of the legs of said Z which is displaced from the plane of the remainder of said leg.

14. The element as defined by claim 1, further comprising a sealed, transparent casing surrounding said indicator.

15. An element suitable for construction of a magnetically actuated fluid-level indicator for indicating the level of a fluid contained in a vessel having a gauge tube attached thereto and having a magnet-containing float freely floating in the gauge tube, the indicator length adapted to correspond to the maximum expected variation of fluid level in said vessel, said element comprising:
  a. a support body having a substantially U-shaped cross section;
  b. an indicating means comprising a magnetically actuatable platelet having a Z-shaped vertical cross section; and
  c. mounting means positioned on said support body and cooperating with the legs of said Z-shape such that the center of gravity of said indicating means lies on an axis of rotation of said indicating means, thereby providing for a free rotation about said axis.

16. An element as recited in claim 1, wherein: said mounting means comprise mounting pins integrally formed on said support body for supporting said platelet, whereby said element is easily produced without requiring hand-insertion of said mounting pins.

* * * * *